June 17, 1930.  W. A. FRANTZ  1,765,067
DOMESTIC WASHING MACHINE
Filed June 25, 1928   2 Sheets-Sheet 1

Inventor
WALTER A. FRANTZ.

By Smith and Freeman
Attorneys

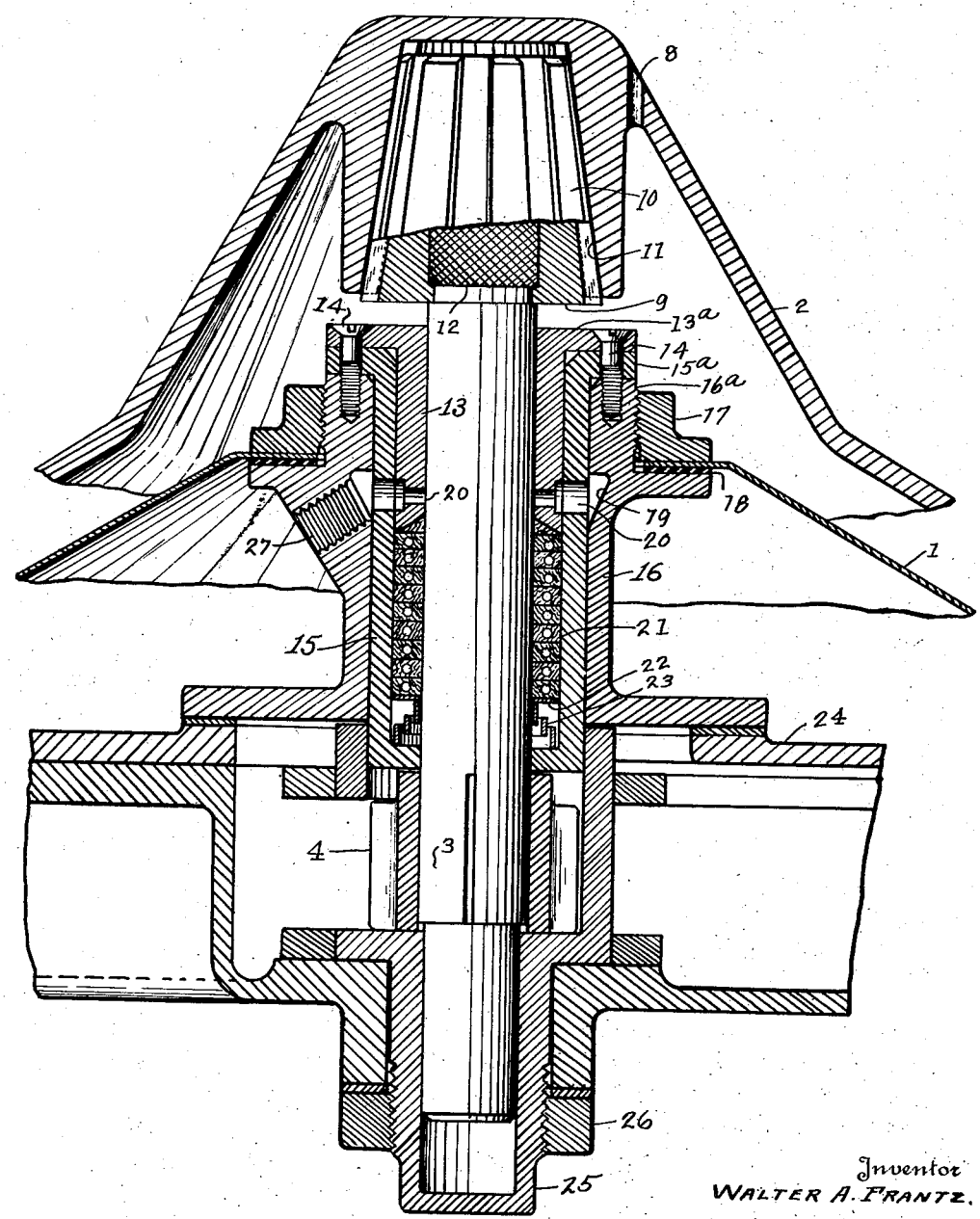

Patented June 17, 1930

1,765,067

UNITED STATES PATENT OFFICE

WALTER A. FRANTZ, OF CLEVELAND HEIGHTS, OHIO, ASSIGNOR TO THE APEX ELECTRICAL MANUFACTURING COMPANY, OF CLEVELAND, OHIO, A CORPORATION OF OHIO

DOMESTIC WASHING MACHINES

Application filed June 25, 1928. Serial No. 288,081.

This invention relates to domestic washing machines, and in particular the washer agitator drive and drive shaft bearing.

According to one design of washing machine it has been customary to secure in the tub bottom a plane bearing sleeve rising some distance above the water line of the tub, for the shaft that supports and drives the agitating element. With this arrangement it is not necessary to maintain a liquid seal at the bearing to prevent the escape of water from the tub, as the bearing is located above the water line.

Another construction commonly resorted to is the use of a shorter shaft, the bearing of which is located wholly below the waterline, in combination with packing means to prevent the escaping of water from the tub through the drive shaft bearing.

With either of the above arrangements, it is customary to have the agitator removably connected to the shaft so that it may be removed by simply lifting it off the shaft end. This connection is commonly made by splining the end of the shaft and forming complementary splines in a central recess formed in the agitating element. Where the splines are formed directly on the shaft, it is necessary to have a very large shaft to prevent undue wear on the spline, which in time allows the agitator to become loose, causing the machine to become noisy and have a considerable amount of vibration at this point.

This latter objection has been overcome by casting an enlarged tapered and splined head on the driving shaft that automatically compensates for wear by allowing the agitator to assume a lower position as head becomes worn, maintaining for an indefinite time a tight driving connection at this point.

The use of the enlarged fixed agitator driving head makes it impossible to drop the shaft through its upper bearing, necessitating the removal of a considerable portion of the driving mechanism to get at this shaft for repairs or other reasons.

One of the objects of my invention is to provide a drive shaft and bearing assembly for a washing machine agitator that may be readily and quickly installed or removed as a unit from the assembled machine without disturbing any other mechanism.

A further object of my invention is to provide a drive shaft and bearing for a washing machine agitator that has packing means which automatically adjusts itself to wear maintaining at all times a fluid tight seal.

Stated in general terms, my invention consists of a provision of a stub shaft and bearing with packing for a washing machine agitator, assembled as a unit which may be readily inserted or removed from the washer. An enlarged tapered splined head is cast on the end of the shaft and is adapted to register with a complementary opening, or cavity formed in the agitator.

The advantages of this arrangement are first, due to the splined and tapered driving head, the agitator, at all times is tightly connected thereto. The automatic take-up for the shaft packing removes the necessity of constantly tightening up the packing to prevent the escaping of water around the shaft. By constructing the shaft and bearing as a unit which may be installed or removed from the top of machine, without disturbing any of the other mechanisms, a great deal of time and labor is saved in constructing the machines in the first place, and in subsequent repairs.

These and other objects and advantages of my invention will become more fully apparent as the description thereof proceeds and will then be more specifically defined in the appended claims.

In the accompanying drawings, forming the material part of this disclosure:

Figure 2 is an enlarged side elevational view, in section, of the drive shaft bearing, agitator connection and associated elements.

Figure 1:
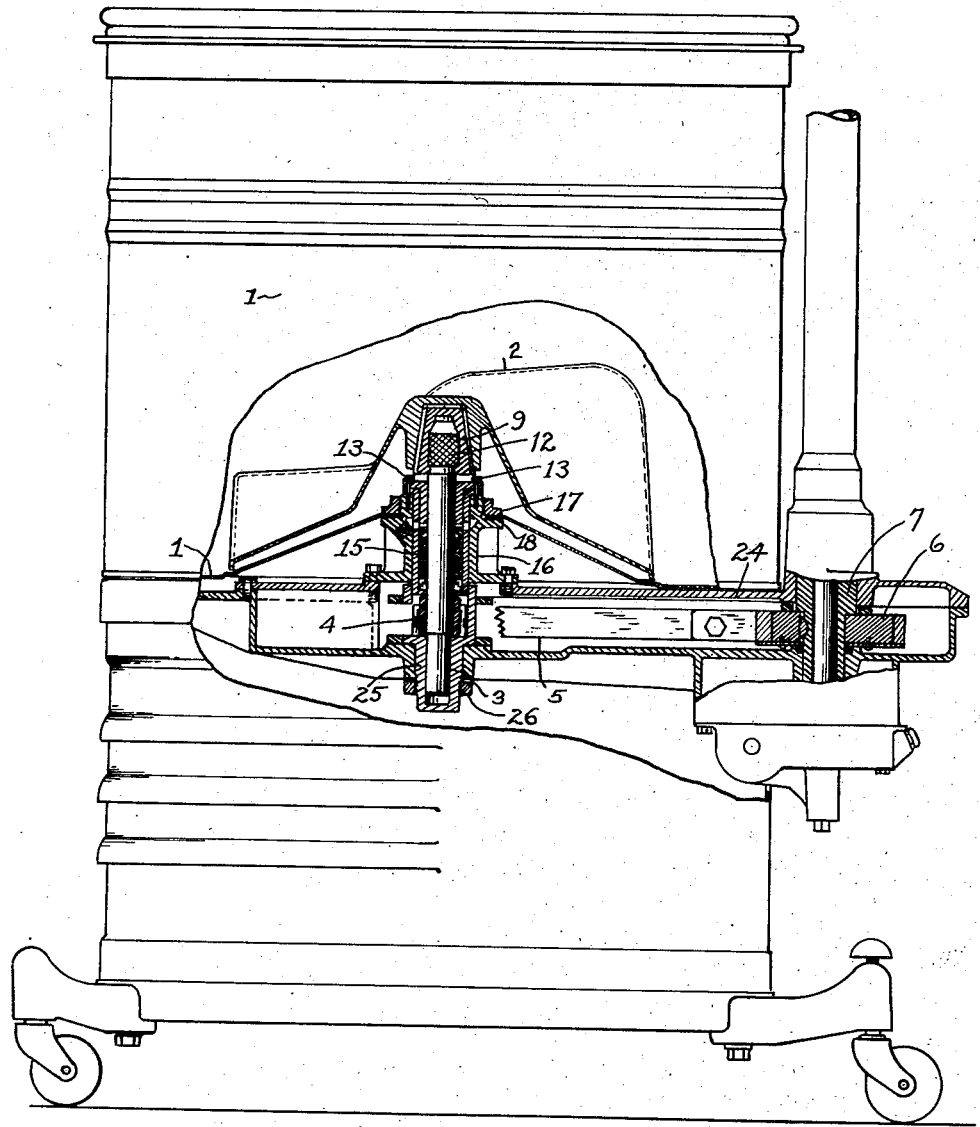
Figure 1 is a side elevational view, partly in section, showing my invention as applied to the conventional washing machine of the gyrator type.

The washing machine shown in Figure 1 comprises a tub 1, enclosing an agitator 2, which is supported in driving relation on a shaft 3. The shaft 3 is provided with a pinion 4 which meshes with a suitable rack, not shown, carried by or formed on the rod 5 which is in turn connected in driving relation to the eccentric 6. The eccentric 6 is rigidly secured to a hollow shaft 7, that is in turn connected to a driving motor. In this manner the power from the motor is transmitted to the shaft 7, which by means of the eccentric 6, transmits a reciprocating motion to the rod 5, which in turn oscillates the shaft 3 and the agitator 2, which is detachably secured thereto. The agitator 2 is provided with a hole 8 to permit the escape of air from under the agitator, so that it may not be floated off. The driving head 9 is shown as a casting, which is molded on the knurled end 12 of the shaft 3 and is thus permanently fixed thereto. By this arrangement a large driving head may be used adding considerably to the life of the machine, and at the same time reducing the cost, as a comparatively small diameter shaft may be used. The driving head 9 is received in a suitable recess provided in the agitator 2, said head and recess being formed with complementary interfitting driving projections 10 and 11.

The driving mechanism is enclosed in a gear box 24 located beneath the tub and having any desired shape. Carried by the top face of this gear box is a hollow fitting 16, the upper end 16a of which projects through the tub bottom which is secured thereto in fluid tight relation by means of a lock nut 17 and gasket 18. The bore of this fitting opens into the gear box at the bottom and into the tub at the top, and removably mounted in this bore is a hollow sleeve 15 which carries the bearings for the shaft 3. This sleeve is arranged to be attached and removed from the top and is secured in place by suitable means such as the screws 14 located in the flange 15a and entering the end 16a and so arranged as to be accessible past the head 9. The pinion 4 is made smaller than this sleeve 15 so as to enable the sleeve and shaft to be inserted and removed as a unit without the need of detaching the pinion from the shaft. This is particularly important when a permanent head is used at the upper end of the shaft. The mode of attaching the pinion is unimportant.

The detail construction of the shaft bearing is relatively unimportant. I have shown the upper end of the sleeve 15 as provided with a removable upper bearing 13 having a flange 13a overlapping the end of the sleeve 15 and held in place by the same screws 14. Also, to prevent leakage I have shown the lower portion of the sleeve 15 below the bearing 13 as provided with packing 21, of conventional type. A washer 20 is provided below the packing 21 and is pushed thereagainst by means of a flat helical compression spring 23. By this arrangement the packing is always held in fluid tight relation against the shaft 3, wear being automatically compensated for by the spring take-up. The fitting 16 is secured in any suitable manner to the gear box 24, which supports the lower bearing 25 for the shaft 3. The bearing 25 is securely held to the casting 24 by means of a lock nut 26. I have shown the interior of the fitting 16 as formed with a groove 19 communicating on the one side with a threaded socket 27 adapted for the reception of a grease cup or other lubricating device, and on the other side with passages 20 in the bearing 13 to enable the lubricant to reach the shaft 3.

The power plant, wringer, control devices and other features necessary to the operation of a washing machine are not here specifically shown or described as they are not essential to the disclosure of this invention.

It will be apparent from the foregoing description that when it is desired to remove the shaft 3, or gear 4 from the washer, all that is required to be done is to pick up and remove the agitator 2, then remove the screws 14, and the shaft 3 and gear 4 along with the bearing 13 and packing means may be removed as a unit from the washer, without disturbing the tub or any other mechanism, and without opening the gear box so as to allow leakage of its contents. This arrangement greatly facilitates the removal and repair of the aforementioned parts and is of such construction that it may be used with many other types of washers and other appliances in addition to the washer shown, which was selected merely for illustrating this device.

It is to be understood that while I have described and shown the preferred form of my invention as an example, such changes may be made therein as fall within the scope of the appended claims, without departing from the spirit of the invention and the principle involved.

Having thus described my invention what I claim as new, and desire to secure by Letters Patent, is:

1. In a washing machine, a tub, a fitting secured in the bottom thereof, an agitating device in the tub, a drive shaft therefor, an enlarged driving head rigidly carried by said shaft to provide a detachable connection for said agitating device, a bearing sleeve for said shaft detachably secured in said fitting, a pinion carried by said shaft and having a diameter smaller than that of said bearing sleeve, said sleeve and shaft and head and pinion being detachable and removable from above, and means for detachably securing said bearing sleeve to said fitting.

2. In a washing machine, a tub, a fitting secured to the bottom thereof in leak-tight relation, said fitting having a bore opening into said tub, an agitating device in said tub, a drive shaft therefor, means for detachably connecting said agitating device to said shaft, a bearing sleeve for said shaft detachably secured to said fitting, a pinion carried by said shaft, said pinion having a diameter smaller than said bore, and means for detachably securing said sleeve to the top of said fitting whereby said sleeve and shaft and pinion can be removed from said fitting upwardly through said tub.

3. In a washing machine, a tub having an apertured bottom, a fitting secured to said bottom in leak-tight relation, said fitting having a bore therethrough which registers with said aperture, a bearing sleeve detachably secured to said fitting, an operating shaft mounted in said bearing sleeve, and an operating element carried by the lower end of said shaft, the diameter of said element being less than that of said bore whereby said shaft and sleeve and element can be removed upwardly through said tub.

4. Driving mechanism for a washing machine comprising a fitting having a bore therethrough, a bearing sleeve detachably secured to said fitting, a drive shaft journaled in said sleeve, and a pinion carried by said shaft, said pinion having a diameter smaller than said bore.

5. In a washing machine, a tub having an aperture in its bottom, a gear-box located beneath said tub, a fitting projecting from said gear-box and secured in leak-tight relation to said tub bottom, said fitting having a vertical bore therein registering with said opening and opening into said gear-box, a bearing sleeve located in said fitting, an operating shaft journaled in said bearing sleeve, a pinion carried by the lower end of said shaft, means for securing a washing element to the upper end of said shaft, and means for securing said sleeve to the top of said fitting, the diameter of said pinion being less than that of said bore to permit said shaft, bearing sleeve, and pinion to be applied and removed vertically through the top of said fitting.

6. In a washing machine, a tub, a fitting connected in leak-tight relation to the bottom of said tub and having a recess opening into said tub, a bearing member detachably secured to the top of said fitting, a removable operating member mounted in said bearing member, an agitating element secured to the upper end of said member, and an operating element secured to the lower end of said member, said last named element being smaller than the recess in said fitting so as to enable said member and bearing and operating element to be removed and replaced as a unit.

7. In a washing machine, a fitting having a longitudinal bore therethrough, means for securing said fitting to the bottom of a tub with said bore opening into said tub, a hollow bearing sleeve detachably mounted in said fitting and means for securing said bearing sleeve to the top of said fitting so as to be removed from above, said bearing sleeve being formed for the reception of a movable operating member.

8. An agitator drive for washing machines and the like comprising a fitting having a recess therein, means for securing said fitting in the bottom of a tub in leak-tight relation with said recess opening into the tub, a bearing member adapted to fit in said recess, a drive shaft mounted in said bearing member, said bearing and shaft and packing means being insertable and removable from above as a unit.

9. Driving mechanism for a washing machine comprising a shaft, an enlarged driving head formed on one end of said shaft, a pinion carried by said shaft adjacent to its other end, a bearing for said shaft located between said driving head and pinion and a hollow fitting surrounding and supporting said bearing, said pinion being smaller than the exterior of said bearing.

10. In a washing machine, a tub having an aperture in its bottom, a fitting secured in leak-tight relation to the tub bottom and having a bore registering with said aperture, a bearing detachably secured to said fitting in line with the bore therein, a drive shaft journaled in said bearing, a connecting element carried by the end of said shaft, a packing element carried by said bearing, and self-contained means carried by said bearing for automatically adjusting said packing, said bearing and shaft and connecting element being removable from said fitting as a unit.

11. An operating device comprising, in combination, a gear-box, a hollow fitting projecting therefrom and having a bore therethrough which opens into said gear-box, a bearing detachably secured to said fitting in line with the bore therein, a movable member mounted in said bearing, and a driving element secured to said member inside said gear-box, said element being smaller than said bore to enable said member and element and bearing to be removed.

12. A fluid container, a rotatable shaft projecting in said container, a pair of enlarged driving members rigidly secured to said shaft at a point adjacent each end thereof, a bearing and fluid packing means cooperating with said shaft between said driving members, and means to removably secure said bearing to said fluid container.

13. A fluid container, a rotatable shaft projecting in said container, a pair of enlarged driving members rigidly secured to said shaft at a point adjacent each end thereof, a bearing and self adjusting fluid packing means cooperating with said shaft between said driving members, and means to removably secure said bearing to said fluid container.

In testimony whereof I hereunto affix my signature.

WALTER A. FRANTZ.